(12) United States Patent
Causey et al.

(10) Patent No.: US 8,385,980 B2
(45) Date of Patent: Feb. 26, 2013

(54) DEVICES AND METHODS FOR CHANGING THE APPEARANCE OF A MOBILE COMMUNICATIONS DEVICE

(75) Inventors: Mark Edward Causey, Tucker, GA (US); Adrianne Binh Luu, Roswell, GA (US); Scott Andrus, Prior Lake, MN (US); Kevin Wray Jones, St. Louis Park, MN (US)

(73) Assignee: AT&T Mobility II LLC, Atlanta, GA (US)

( * ) Notice: Subject to any disclaimer, the term of this patent is extended or adjusted under 35 U.S.C. 154(b) by 804 days.

(21) Appl. No.: 12/038,633

(22) Filed: Feb. 27, 2008

(65) Prior Publication Data

US 2009/0215498 A1   Aug. 27, 2009

(51) Int. Cl.
*H04M 1/00* (2006.01)
(52) U.S. Cl. ..................... 455/566; 455/575.1
(58) Field of Classification Search .................. 455/566, 455/575.1, 575.3; 341/23; 345/156, 168, 345/173
See application file for complete search history.

(56) References Cited

U.S. PATENT DOCUMENTS

| | | | |
|---|---|---|---|
| 6,035,180 A * | 3/2000 | Kubes et al. | 455/575.1 |
| 6,608,996 B1 * | 8/2003 | Laurikka et al. | 455/90.3 |
| 6,977,808 B2 * | 12/2005 | Lam et al. | 361/679.24 |
| 6,999,804 B2 * | 2/2006 | Engstrom et al. | 455/575.3 |
| 7,206,618 B2 * | 4/2007 | Latto et al. | 455/575.8 |
| 7,443,566 B2 * | 10/2008 | Lerenius et al. | 359/265 |
| 7,766,517 B2 * | 8/2010 | Kerr et al. | 362/362 |
| 7,774,029 B2 * | 8/2010 | Lee et al. | 455/566 |
| 2003/0036412 A1 * | 2/2003 | Chong | 455/566 |
| 2003/0160741 A1 * | 8/2003 | Martinez | 345/49 |
| 2005/0107140 A1 * | 5/2005 | Kim | 455/575.3 |
| 2005/0285835 A1 * | 12/2005 | Jessop | 345/89 |
| 2006/0055677 A1 * | 3/2006 | Suurpaa et al. | 345/173 |
| 2006/0197753 A1 * | 9/2006 | Hotelling | 345/173 |
| 2007/0152957 A1 * | 7/2007 | Shibata | 345/156 |
| 2008/0074383 A1 * | 3/2008 | Dean | 345/156 |
| 2008/0211699 A1 * | 9/2008 | Mao | 341/23 |
| 2009/0111536 A1 * | 4/2009 | Tanaka | 455/575.3 |

* cited by examiner

*Primary Examiner* — Lester Kincaid
*Assistant Examiner* — Steven Kelley
(74) *Attorney, Agent, or Firm* — Moazzam & Associates, LLC (57) ABSTRACT

The present invention is a housing of a mobile communications device that is entirely covered in pixels. The pixels allow the appearance of the housing to be customized or changed as a user desires. The pixels can be part of an active matrix or passive matrix LCD display that comprises the entire housing. A logic unit on the device allows the appearance of the housing to be selected, created, or downloaded.

20 Claims, 6 Drawing Sheets

DEVICES AND METHODS FOR CHANGING THE APPEARANCE OF A MOBILE COMMUNICATIONS DEVICE

BACKGROUND OF THE INVENTION

1. Field of the Invention

The present invention relates to mobile devices. More specifically, the present invention relates to incorporating pixels into the outer housing of a mobile device in order to implement various designs on the outer housing.

2. Background of the Invention

Mobile devices are commonplace in today's society. Currently, there are roughly 3.3 billion mobile subscribers in the world. Around 80% of the world enjoys mobile coverage. Mobile communication is the least of what a mobile device can do today. Many devices are equipped with abilities like text messaging, picture and video messaging, and even an internet connection. The mobile device has become a staple for business and other facets of the community.

As younger generations possess more mobile devices, a need to customize and make them stand out becomes increasingly pervasive. With such a large number of mobile devices and only a limited number of personalized designs for the outer cover, the desire to differentiate one cell phone from another is increasing. Mobile device manufacturers are constantly changing the shape and size of the devices, but the faceplate market keeps up with the technology, producing new looks for the latest mobile devices.

Changing the faceplate is just one method of accomplishing the personalization of mobile devices. It was one of the first methods along with changing the ring tone of the mobile device. This was especially popular because people could tell if their phone was ringing simply by listening to the ring tone. This was clearly not enough for mobile device users as adding light up keys, adding a light up antenna, and changing the color of the device's inner LEDs became popular. Some of these kits were entirely made by third party manufacturers. A lucrative submarket has formed in changing the look of mobile devices that is still growing. Customers purchase and install accessories, making their mobile device unique.

Since color LCDs have become more popular and thus cheaper to manufacture, manufacturers have not been reticent about installing these into their latest mobile devices. In fact, some mobile devices have screens that take up most of the space on the front face of the mobile device. This is most commonly found on personal digital assistant (PDA) devices. These mobile devices also employ touch screens, making the full screen very useful in its applications. Many owners of PDA devices will customize their home screen. This customization includes solid colors, patterns, or even high quality photographs. Most faceplates will not feature high quality photographs mainly due to the lack of durability of a medium capable of holding a high quality photograph. However, the LCD makes this option viable. Another advantage PDA device users enjoy is the ability to make their home screen animated. The LCD screen makes changes instantly and often while running through its software programs, similar to that of a personal computer However, these methods are still limited in their ability to customize the overall appearance of a device. LCD touch screens provide only an interface to the functionality of the device. What is needed is a way to easily change the appearance of a mobile device such that a user can customize and personalize their own devices at will, or a method of changing the look of the mobile device on demand and with the ability to change its appearance instantly and on the fly.

SUMMARY OF THE INVENTION

The present invention is a handset housing for a mobile communications device having an outer surface completely covered in pixels. The user can change the colors and design of the pixels, allowing personalization and customization of their mobile communications device. A logic unit on the mobile device sets the color of each pixel and can change it in real time. The user can set a solid color to the device, or a design of multiple colors. The program can also change the design every so often. Furthermore, an animated image can be displayed on the housing of the device.

In an exemplary embodiment of the present invention, the invention is a mobile device housing comprising an outer housing covered in pixels, a connection between the outer housing and a CPU of the mobile device, and a logic unit which controls the pixels. In this embodiment, the entire or substantially the entire outer housing of the mobile device can change to an appearance when an electrical signal is sent to the pixels based upon operation of the logic unit.

In another exemplary embodiment of the invention, the invention is a method of changing the appearance of the housing of a mobile communications device, comprising the steps of running a program which controls a display on a housing, selecting a desired display from the program, and communicating the desired appearance to the pixels on the housing. In this embodiment, the housing of the mobile communications device is entirely or substantially covered in pixels.

In a further embodiment of the invention, the invention is a mobile device, comprising a power supply, a phone portion comprising a first plurality of electronic components connected to the power supply, a computer portion coupled to the phone portion comprising a second plurality of electronic components connected to the power supply, a housing for the first and second pluralities of electronic components, said housing comprising an LCD display connected to the power supply, and a logic unit on the computer portion, wherein portions of the housing can change appearance when an electrical signal is sent to the LCD display based upon operation of the logic unit.

DETAILED DESCRIPTION OF THE INVENTION

The present invention is a mobile communications device having an outer housing that incorporates a plurality of pixels.

Each pixel is capable of displaying virtually any color in the spectrum, and can change instantly and on demand. This allows the user to customize the appearance of their mobile communications device in any color, pattern, or image. A logic unit on the mobile device sets the color of each pixel and can change it in real time. The user can set a solid color to the device, or a design of multiple colors. The logic unit can also change the design every so often. Even an animated image can be shown on the device.

"Logic Unit" as used in this disclosure refers to a set of instructions. Logic unit can comprise a software program, a programmed hardware device such as a chip, or a combination of both. The logic unit may be present on the device itself, or may be accessible via a link to a personal computer such as a USB link. "Pixel", as used in this disclosure, refers to a sub-part of an electronic display responsible for exactly one pixel of a computer graphic image. The term "pixel" is generally used both to describe the smallest element of a computer graphic image and to describe the smallest individually-powered cell in a liquid crystal display (LCD). However, as used herein, "pixel" will not be limited to cells found in LCD's, but will encompass the equivalent of all forms of electronic displays known in the art. "Housing" or "outer housing" are used synonymously and refer to the outer casing of the device, usually to protect the electronic components within the housing and to provide a user with a surface to hold the device with. Housings are generally made of a plastic compound or metal alloy or any combination of materials suitable to provide electric insulation from the inner electronics while preventing them from being damaged. However, in the present case, housing refers to an outer casing for a device that can change its appearance (color) on demand. A "mobile communication device" or "mobile device", as used in this disclosure, refers to a wireless device used for communication that requires a battery for power. This includes devices such as a cellular telephone, personal digital assistant (PDA), portable computer, pager, etc.

Figure 1:
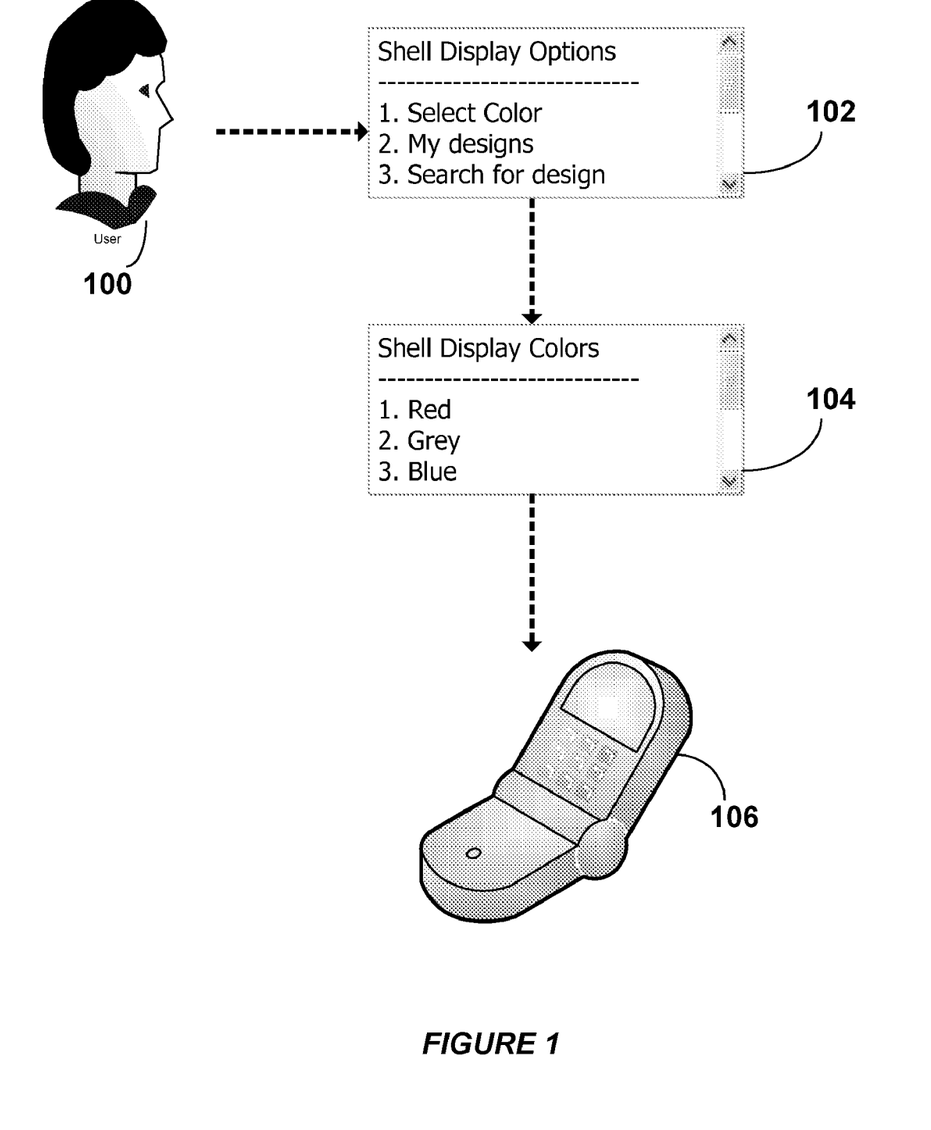
FIG. 1 shows a system for selecting parameters and displaying a particular design on a mobile communications device, according to an exemplary embodiment of the present invention.

FIG. 1 shows a system for selecting parameters and displaying a particular design on a mobile communications device, according to an exemplary embodiment of the present invention. The user 100 first selects from a housing display options menu 102. The housing display options menu 102 contains preset designs including but not limited to colors, patterns, and animations, as well as the ability to search for other designs. This search includes downloaded designs, available designs on the internet, and user created designs. These designs may be stored on a database on the device or on a server on a network operated by a service provider. After a selection is made in housing display options menu 102, a submenu 104 is presented. The submenu 104 may contain designs, colors, image cycling options, etc. based upon the menu option chosen. User 100 then selects from an option from submenu 104. The choice of user 100 is then displayed on the housing of the mobile device 106.

In one embodiment of the present invention, user 100 selects from a housing display menu on a mobile communications device 106. User 100 selects from several choices including color, preset design, or search for a design. The user wants his mobile communications device 106 to appear red, so he chooses the color option from the menu. Next, the user selects red from the list of available colors in the submenu. Upon making his selection, the mobile communications device 106 displays the color red on all of the pixels located on the housing of the mobile communications device 106. Alternatively, user 100 may prefer to display a design or a pattern on his device. User 100 would select "my designs" from menu 102, and would be presented with a series of patterns in submenu 104. User 100 may also be provided with a series of options on how to display the pattern, including positioning, tiling, and other options. The pattern itself may be a JPEG or GIF file, or may derive its appearance from any set of instructions in a file known to one skilled in the art. User 100 may also be presented with a series of options related to how the display changes over time. User can set a slideshow of personal images, or even schedule color changes to correspond to the time of the day. In one embodiment, user 100 can adjust the brightness and contrast of the housing display to reflect the battery level of the device. This helps to conserve battery power.

Figure 2:
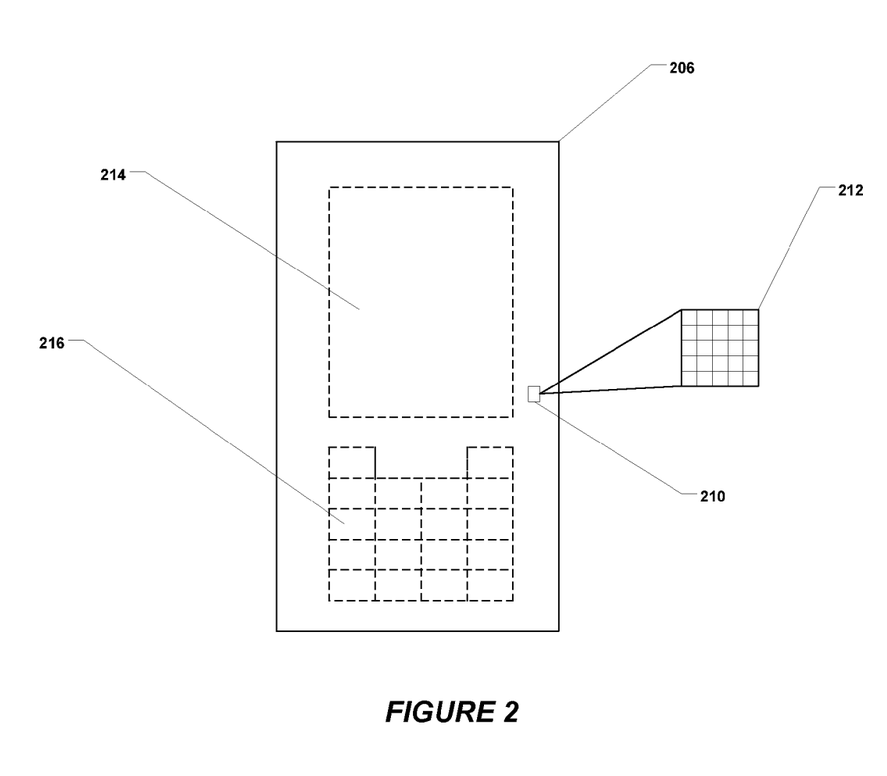
FIG. 2 shows the housing of a mobile communications device, according to an exemplary embodiment of the present invention.

FIG. 2 shows an exemplary embodiment of the housing of a mobile device. In this embodiment, the housing of the mobile device 206 is completely covered by pixels 212. Each small section 210 of the housing contains a grid of numerous pixels 212 which are used to create images and change the appearance of the mobile device 206. In one embodiment of the present invention, the entire surface of the housing 214 is touch-sensitive. In another exemplary embodiment of the invention, the housing of the mobile device contains a button or touch-sensitive area that enables the use of these features. The keypad 216 may be touch sensitive or alternatively have actual buttons. Additionally, only screen 214 may be touch sensitive such that the user may select options visible on the screen 214. This enables a software vendor or operating system vendor to provide customized user interfaces independent of the hardware configuration of the device itself. For instance, when mobile device 206 is in use, pixels 212 produce a screen 214 and keypad 216, allowing the user to make phone calls, create and send text messages, e-mail, etc. When user accesses a web browser, the entire front screen can turn into the web interface, with zoned areas for buttons and other features, and a pop-up keyboard only when necessary. Other combinations will be apparent to one skilled in the art.

In one exemplary embodiment, the invention uses a liquid crystal display (LCD) element to create the pixels. In this embodiment, LCD elements surround the housing of the device. Colors are produced by varying the voltage in the electrical signals sent to the LCD elements. LCD technology requires a power source to display and change colors. An exemplary embodiment of the present invention uses an active-matrix addressed display. Active-matrix devices store the electrical state of each pixel on the display while all the other pixels are being updated. In this embodiment, each pixel or subpixel is attached to thin-film transistors (TFTs) which are further attached to a power source. With the thin-film transistor, each pixel has its own dedicated transistor, giving it a generally brighter and sharper image as well as giving it a quick response time. These thin-film transistors are created by depositing thin films for the metal contacts, semiconductor active layer, and dielectric layer. Optionally, a transparent outer layer may further surround the LCD elements in order to protect them.

Figure 3:
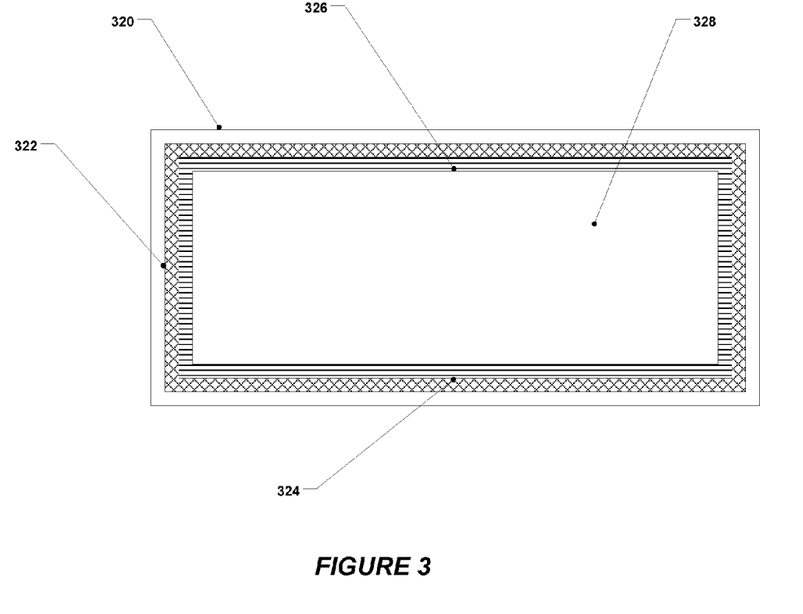
FIG. 3 shows the outer layers of the mobile communication device, according to an exemplary embodiment of the present invention.

FIG. 3 shows an exemplary embodiment of the outer layers of the mobile device. The outermost layer is the transparent outer layer 320. This layer is made of transparent plastic, or other transparent material, which serves as a protective layer for the LCD element 322. Transparent outer layer 320 completely surrounds the mobile device in the areas where the LCD element 322 is present. The LCD element 322 is located beneath the transparent outer layer. It comprises LCD panels that, when activated by various voltages, produce desired colors and designs, said colors and designs being accessible via a database of options presented via a user interface. Below the LCD element 322 is a thin-film transistor (TFT) layer 324.

This layer connects each individual pixel to a power source. The internal components 328 and battery of the mobile device provide a power source to the TFT layer 324. Below TFT layer 324 is a backlight layer 326. This layer 326 shines light through the other layers to make images and colors visible. In an embodiment of the invention, backlight layer 326 utilizes light emitting diodes (LED) as a light source. Alternatively, backlight layer 326 is comprised of a reflective surface, such that it reflects light from outside the mobile device and allows the LCD images and colors to be visible.

Another embodiment of the present invention uses a passive-matrix addressed display. The technology will be apparent to one skilled in the art, but generally, in this embodiment, each row or column of pixels has its own single electrical circuit. The pixels are addressed one at a time by row and column addresses. The electrical circuit is connected to the internal components and power supply.

In a further embodiment, the LCD layer uses zero power bi-stable LCD technology. In this embodiment, it is not necessary to continuously power the LCD display. Power is only necessary in order to change the image. The image or pattern will stay on the housing until a new pattern is selected, at which point voltage is applied to the layer to update the image. Thus, once the user has selected an image color for the housing of the device, the display of this image or color will remain without drawing more power from the device's battery.

Figure 4:
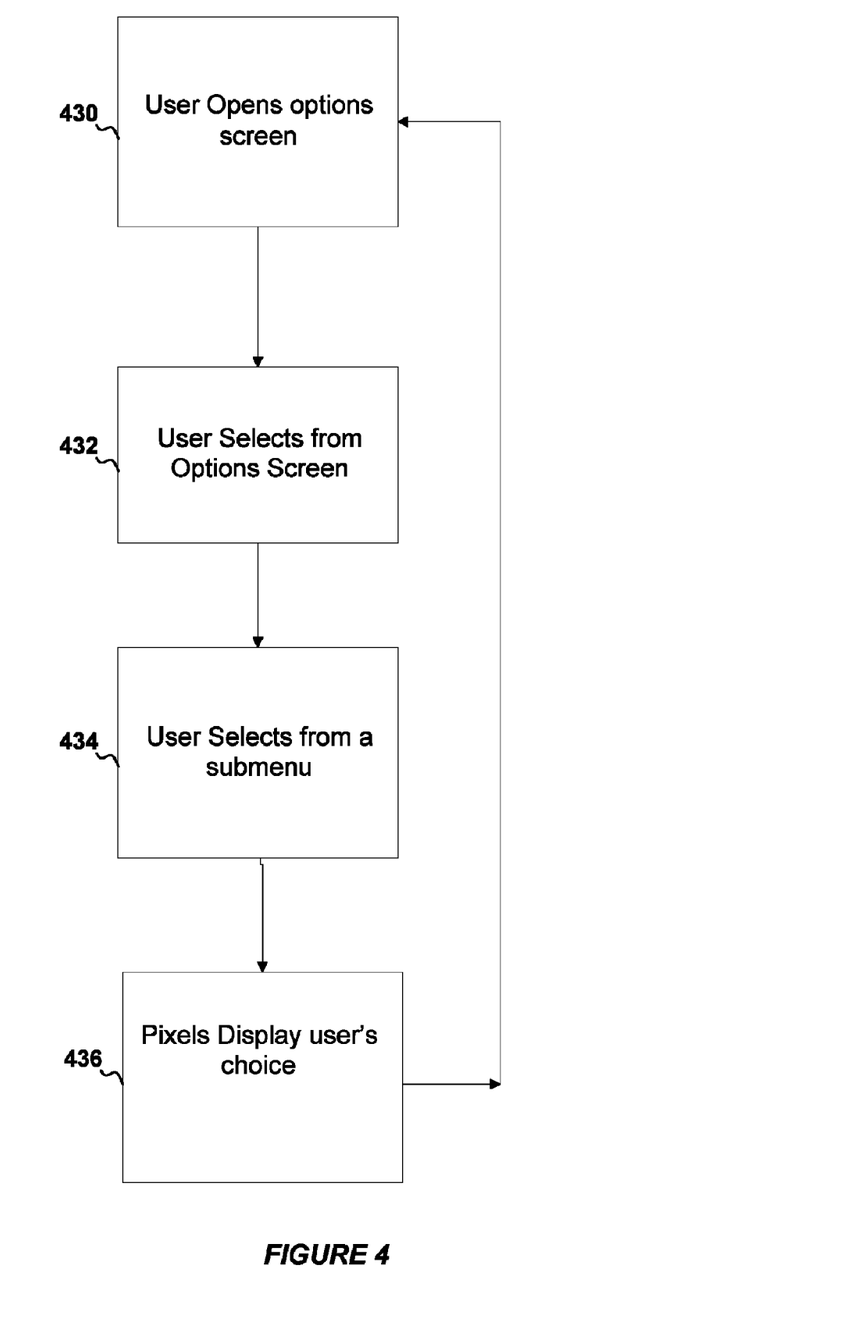
FIG. 4 shows a flow chart of the process used in making a selection from the menu, according to an exemplary embodiment of the present invention.

FIG. 4 shows a flow chart of the process used in making a selection from the menu. In step 430, the user opens an options menu. Options comprise the ability to change colors, patterns, find new patterns, as well as change other settings related to the display. Next, the user makes his selection from the options menu in step 432. Depending upon the choice made from step 432, the user then selects from the corresponding submenu in step 434. For instance, if the user selects "colors", a list of available colors will be displayed. Alternatively, if the user selects "settings", then other options will be displayed such as brightness, contrast, power saving options, and other settings. Upon the user's selection from the submenu from step 434, the corresponding choice is displayed on pixels located on the mobile device in step 436. For instance, the user may opt to find a saved design on the user's mobile device. The user then selects the desired design from a submenu containing all of the user's saved designs. Upon selecting the desired design, the pixels on the housing cover of the device collectively display the selected design.

In an exemplary embodiment of the invention, the mobile device is programmed to change the pixels at certain specified intervals of time. For example, the user may select to change the appearance of his device once a day at a set time. The user selects the "cycle" or "scheduling" option from the device's menu. From the submenu that appears, the user selects which appearances he would like the mobile device to cycle through. At the set time or occurrence, the program changes the appearance to the next selected appearance. The user may additionally select random changes. In this embodiment, instead of cycling to the next selected appearance the program will choose randomly from the selected appearances. Alternatively, the program randomly chooses an appearance from all possible appearances. Appearances can be added by downloading the appearances to the mobile device or can be created by the user directly on the mobile device. These appearances may be in the form of animated images as well as videos. The user may access the appearance program and select from any of the appearances at any time.

Various configurations of the above options should be apparent to one skilled in the art. For instance, the user may select that he wishes his mobile device to change appearance anytime he opens the device. The user selects an original color and design through the menu and submenu. In this example, the user selects the color blue for the appearance. The user then selects the cycle feature. In the submenu that appears, the user selects to change the appearance when the mobile device is opened or otherwise in use. The user then is diverted back to the appearance menu. For this example, the user selects an animated design featuring an image of a motorcycle driving around the housing. With these features selected, the mobile device will appear blue when not in use. When the user opens his device, the program will automatically switch the appearance to the animated motorcycle design and that design will appear on the housing of the mobile device.

Figure 5:
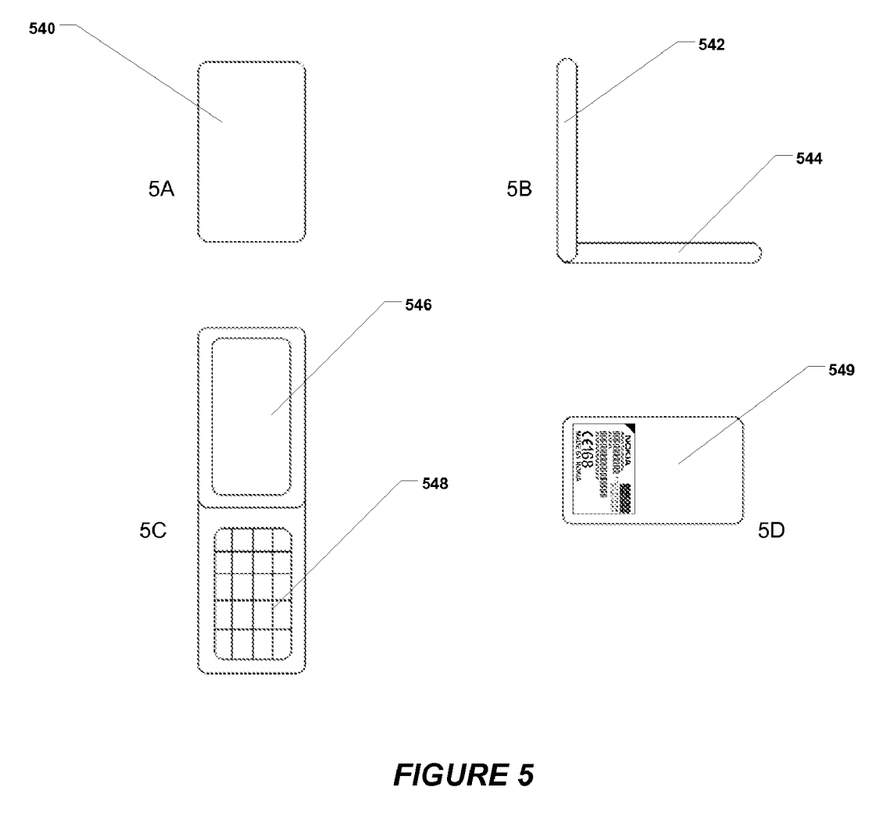
FIG. 5 shows a flip-style device with a LCD housing, according to an exemplary embodiment of the present invention.

FIG. 5 shows an exemplary embodiment of a flip-style device on which the present invention is used. In this embodiment, pixels cover the entire outer portion of the device housing. The front of the device, seen in FIG. 5A, has one or more LCD panels near the outermost layer of the device's body. An optional feature is a transparent outer layer to protect the LCD panels. The front screen shows colors, designs, and video, based upon the user's programmed preferences. Areas of the front may also be programmed to display a clock, caller id, alerts, text messages, etc. FIG. 5B shows a side view of a flip-style device on which the invention is used. The sides of the device also are surrounded by an LCD display. This LCD display may be a continuation of the panel from the front, back, or both. Alternatively, the side LCD display could be comprised of its own panel or panels. FIG. 5C shows a view of the keypad and interior LCD display. The keypad may or may not be comprised of an LCD panel. If the keyboard is an LCD panel, then functionality of the keypad can be defined by various touch sensitive regions. The function of each assigned region, as well as the dimensions of each region can be adapted to the program currently running on the device.

Referring to FIG. 5, the interior LCD panel 546 is used to navigate the functions of the device. Interior LCD panel 546 and keypad 548, if made of an LCD, may also follow the appearance of the outer LCD displays when the device is not in use. FIG. 5D shows the back of the device. The back of the device is entirely surrounded by one or more LCD panels which communicate with the programmable functions of the device. In a further embodiment of the invention, the device has a battery that snaps on to the back of the device. In this embodiment, the back of the battery also has an LCD panel which is connected and communicated with the device and its programmed features.

Figure 6:
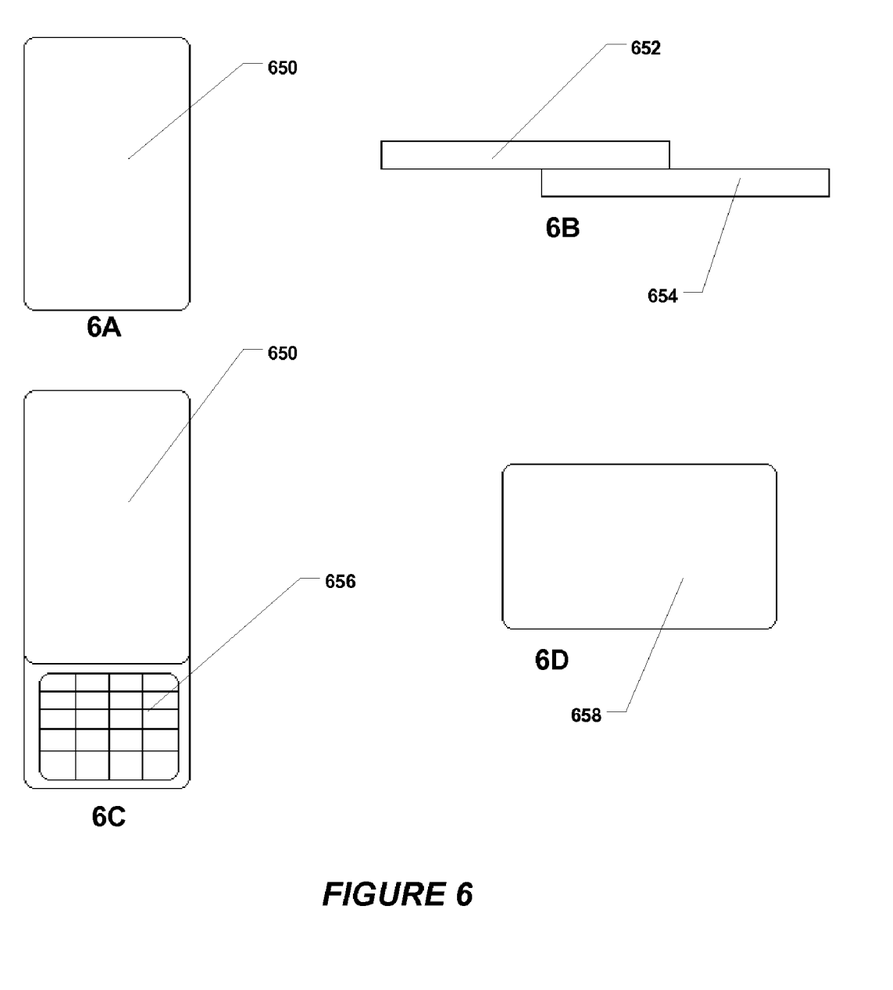
FIG. 6 shows a slider-style device with a LCD housing, according to an exemplary embodiment of the present invention.

FIG. 6 shows a slider-style device with an LCD housing, according to an exemplary embodiment of the present invention. In this embodiment, pixels cover the entire outer portion of the device. The front, seen in FIG. 6A, has one or more LCD panels near the outermost layer of the device's body. A transparent outer layer may be utilized to protect the LCD panels. This screen shows colors, designs, and video, based upon the user's programmed preferences. Areas of the front may also be programmed to display a clock, caller id, alerts, text messages, etc. FIG. 6B shows a side view of an open slider-style device on which the invention is used. The sides of the device also are surrounded by an LCD display. This LCD display may be a continuation of the panel from the front, back, or both. Alternatively, the side LCD display could be comprised of its own panel or panels. FIG. 6C shows a front view of the open slider-style device. In this figure, the interior keypad is accessible to make calls, program functions, etc. The keypad may or may not be comprised of an LCD panel. The front LCD panel provides a usable screen when numbers are dialed, text messages are created, etc. In an embodiment wherein the keypad is LCD, the keypad may also mirror the appearance of the rest of the device when the device is open but not being used. FIG. 6D shows the back of the device. The back of the device is entirely surrounded by one or more LCD panels which communicate with the programmable functions of the device. In a further embodiment of the invention, the device has a battery that snaps on to the back of the device. In this embodiment, the back of the battery also has an LCD panel which is connected and communicated with the device and its programmed features.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A mobile device comprising:
an outer housing;
a key adjacent the outer housing;
a plurality of pixels covering the substantial entirety of the outer housing and the key;
a central processing unit (CPU) in communication with the plurality of pixels; and
a logic unit which controls the plurality of pixels, wherein the plurality of pixels are adapted to change appearance when an electrical signal is sent to the plurality of pixels based upon operation of the logic unit, the logic unit causing the plurality of pixels to display an animated design in response to when the mobile device is placed in an open position;
display a function of the key using a portion of the plurality of pixels covering the key when the mobile device is placed in an open position; and
display a portion of the animated design using the portion of the plurality of pixels covering the key, such that the portion of the plurality of pixels covering the key follows the appearance of the animated design, when the mobile device ceases to be in use.

2. The mobile device of claim 1, wherein the communication between the CPU and the plurality of pixels is facilitated by a thin-film transistor.

3. The mobile device of claim 1, wherein a battery of the mobile device is coupled to the back of the mobile device.

4. The mobile device of claim 1, further comprising a transparent outer layer covering the plurality of pixels.

5. The mobile device of claim 1, wherein the plurality of pixels are part of a liquid crystal display (LCD).

6. The mobile device of claim 5, wherein the LCD is an active matrix addressed display.

7. The mobile device of claim 5, wherein the LCD is a passive matrix addressed display.

8. The mobile device of claim 5, wherein the LCD is a zero power bi-stable LCD.

9. The mobile device of claim 5, further comprising a transparent outer layer covering the LCD.

10. A method of changing the appearance of a housing of a mobile communications device comprising:
running a program which controls a plurality of pixels on the housing and a key adjacent the housing, the plurality of pixels covering the substantial entirety of the housing and the key;
selecting a desired appearance from the program;
communicating the desired appearance to the plurality of pixels;
causing the plurality of pixels to display an animated design in response to when the mobile communication device is placed in an open position;
causing the plurality of pixels to display a function of the key using a portion of the plurality of pixels covering the key when the mobile device is placed in an open position; and
causing the plurality of pixels to display a portion of the animated design using the portion of the plurality of pixels covering the key, such that the portion of the plurality of pixels covering the key follows the appearance of the animated design, when the mobile device ceases to be in use.

11. The method of claim 10, wherein the selecting step further comprises:
selecting a desired category from a menu; and
selecting a desired appearance from a submenu in the desired category.

12. The method of claim 10, further comprising:
downloading a file from the internet;
saving the file to the mobile device; and
allowing a user to access the file with the program.

13. The method of claim 10, wherein the plurality of pixels are part a liquid crystal display (LCD).

14. The method of claim 13, wherein the LCD is an active matrix addressed display.

15. The method of claim 13, wherein the LCD is a passive matrix addressed display.

16. The method of claim 13, wherein the LCD is a zero power bi-stable LCD.

17. A mobile device, comprising:
a power supply;
a phone portion comprising a first plurality of electronic components connected to the power supply;
a computer portion coupled to the phone portion comprising a second plurality of electronic components connected to the power supply;
a housing for the first and second pluralities of electronic components, said housing substantially entirely covered in a first liquid crystal display (LCD) connected to the power supply;
a key adjacent the housing substantially entirely covered in a second LCD; and
a logic unit on the computer portion, wherein the first and second LCDs are adapted to change appearance when an electrical signal is sent to the first and second LCDs based upon operation of the logic unit, the logic unit causing the first LCD to display an animated design in response to when the mobile device is placed in an open position;
causing the second LCD to display a function of the key using the second LCD when the mobile device is placed in an open position; and
causing the second LCD to display a portion of the animated design using the second LCD, such that the second LCD follows the appearance of the animated design, when the mobile device ceases to be in use.

18. The mobile device of claim 17, wherein each of the first and second LCDs is an active matrix addressed display.

19. The mobile device of claim 17, wherein each of the first and second LCDs is a passive matrix addressed display.

20. The mobile device of claim 17, wherein each of the first and second LCDs is a zero power bi-stable LCD.

* * * * *